US007697478B2

(12) United States Patent
Vermola et al.

(10) Patent No.: US 7,697,478 B2
(45) Date of Patent: Apr. 13, 2010

(54) METHOD AND A MOBILE TERMINAL FOR PERFORMING A HANDOVER IN A BROADCAST SYSTEM

(75) Inventors: Larri Vermola, Turku (FI); Harri Pekonen, Raisio (FI)

(73) Assignee: Nokia Corporation, Epsoo (FI)

( * ) Notice: Subject to any disclaimer, the term of this patent is extended or adjusted under 35 U.S.C. 154(b) by 930 days.

(21) Appl. No.: 10/569,298

(22) PCT Filed: Sep. 29, 2004

(86) PCT No.: PCT/IB2004/051916

§ 371 (c)(1),
(2), (4) Date: Feb. 22, 2006

(87) PCT Pub. No.: WO2005/034396

PCT Pub. Date: Apr. 14, 2005

(65) Prior Publication Data

US 2006/0262751 A1    Nov. 23, 2006

(30) Foreign Application Priority Data

Oct. 3, 2003    (GB) ................... 0323214.7

(51) Int. Cl.
*H04W 4/00*    (2006.01)

(52) U.S. Cl. .................. 370/331; 370/351; 370/254; 370/338; 455/436; 455/432.1; 455/442

(58) Field of Classification Search ................ 370/254, 370/351, 216, 248, 431, 331, 349, 255, 256, 370/338; 455/3.01, 3.04, 3.06, 414.1, 432.1, 455/435.1, 440, 442, 437, 412.2
See application file for complete search history.

(56) References Cited

U.S. PATENT DOCUMENTS 6,968,364 B1 * 11/2005 Wong et al. .................. 709/217

(Continued)

FOREIGN PATENT DOCUMENTS

GB    2 346 772 A    4/1999

(Continued)

*Primary Examiner*—Pankaj Kumar
*Assistant Examiner*—Anez Ebrahim
(74) *Attorney, Agent, or Firm*—Harrington & Smith

(57) ABSTRACT

In a digital broadcasting network, a mobile terminal receives hierarchical ESG data relating to available broadcast programs adjacent network areas. The terminal is operable whilst receiving a first program from a transmitter in a first network area for detecting a need for handover to a second network area, and for then determining from the ESG data if the same program is available in the second network area. If it is, the terminal then receives the program from a transmitter in the second network area. Otherwise, it determines one or more programs which are similar to the first program, and presents them on a display for selection by a user. This involves determining which programs have an identifier in common with the first program. The identifier can be any one or more of a program identifier, a service identifier, a channel identifier, a category identifier and a genre identifier, for example.

24 Claims, 7 Drawing Sheets

U.S. PATENT DOCUMENTS

| | | | |
|---|---|---|---|
| 7,213,256 B1 * | 5/2007 | Kikinis | 725/53 |
| 2002/0166128 A1 | 11/2002 | Ikeda et al. | 725/112 |
| 2003/0032389 A1 | 2/2003 | Kim et al. | 455/3.01 |
| 2004/0120285 A1 * | 6/2004 | Paila et al. | 370/331 |
| 2004/0198217 A1 * | 10/2004 | Lee et al. | 455/3.01 |

FOREIGN PATENT DOCUMENTS

| | | |
|---|---|---|
| WO | WO 98/44663 | 10/1998 |
| WO | WO 99/17568 | 4/1999 |
| WO | WO 01/72076 A1 | 9/2001 |
| WO | WO 03081816 A1 * | 10/2003 |

* cited by examiner

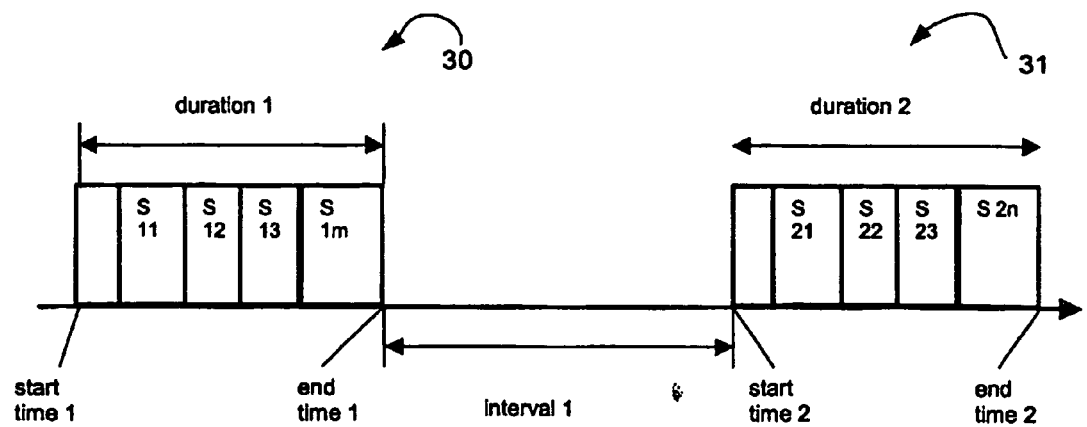
Figure 2
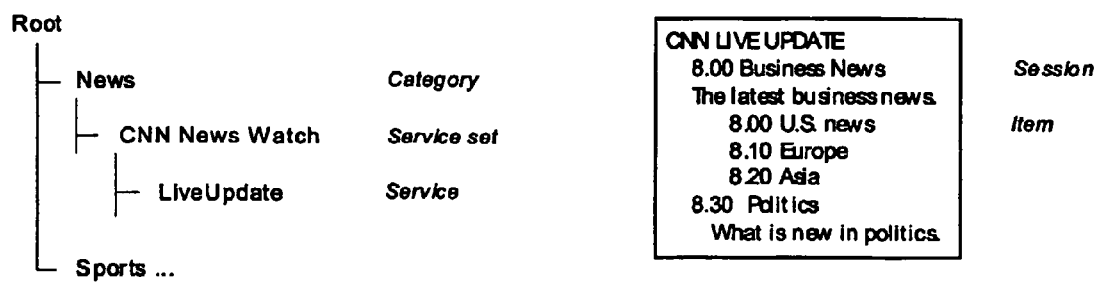
Figure 3A
Figure 3B

Greater London Service Area

| Category | Subcategory | Channel | Service | Program |
|---|---|---|---|---|
| *Sports* | News<br>Motorsports<br>Track&Field<br>*Football*<br>Tennis<br>Golf<br>Others | *LocalCorner*<br>SerieA<br>Bundesleague | *PremierLeague*<br>SportsInTown<br>LeagueCup | *Chelsea-Arsenal* |

Greater Manchester Service Area

| Category | Subcategory | Channel | Service | Program |
|---|---|---|---|---|
| *Sports* | Rugby<br>*Football*<br>Tennis<br>Golf<br>Icehockey<br>Others | *LocalCorner*<br>ManchesterCity | *ManFootball* | *Today's previews from the FA cup* |

Figure 7

METHOD AND A MOBILE TERMINAL FOR PERFORMING A HANDOVER IN A BROADCAST SYSTEM

This invention relates to a method of operating a mobile terminal, comprising determining one or more programs in a second network area which are similar to a first program in a first network area. The invention relates also to a mobile terminal, comprising a processor arranged to use data relating to available broadcast programs in the first and second network areas to determine if the same program is available in the second network area, and otherwise to determine one or more programs which are similar to the first program.

In point-to-multipoint systems, such as broadcast or multicast systems, services are targeted at plural consumers simultaneously. In these systems, channel capacity is divided between different services, instead of between different receivers. As services become more multiform in point-to-multipoint environments, the need to provide targeted content increase. Targeting can be based on location of the user, on a profile of the user, on a profile of the user terminal or on a combination of them, for example. Different services may then have different geographical coverage areas.

In a multicast system, a receiver is able to request services to move with the receiver, so the service area of services changes depending on which receivers are consuming a given service in which cell. For example, an operator advertises a particular service in a particular cell, which a receiver then starts consuming. When the receiver moves to another cell, the receiver can request that the service be moved to that new cell. The multicast operator then decides whether or not to provide that service in the new cell. The decision may be based on capacity in the new cell. If the operator decides not to provide the service in the new cell, service stops from the point of view of that receiver.

In a broadcast system, a broadcast operator decides which services are transmitted when and to which network area. A receiver generally cannot influence broadcasts.

When a receiver moves to a new cell, it may or may not be able to receive the same service that it was receiving previously.

SUMMARY OF THE INVENTION

According to a first aspect of the invention, there is provided a method of operating a mobile terminal, the method comprising: receiving data relating to available broadcast programs in a first network area, and storing said data in the mobile terminal; whilst receiving a first program from a transmitter in the first network area, detecting a need for handover to a second network area; using data relating to available broadcast programs in the second network area to determine if the first program is available in the second network area, and receiving the first program from a transmitter in the second network area if it is available, and otherwise determining one or more programs which are similar to the first program, and subsequently receiving one of the similar programs from the second network area transmitter.

In a preferred embodiment, the same program or one or more similar programs are presented using a user interface. This can include indicating with the or each similar program one or more data elements which are common to that program and to the first program.

To provide a particularly user-friendly handover, the method in a preferred embodiment of the invention comprises requiring user acknowledgement prior to the step of receiving one of the similar programs from the second network area transmitter. This step can be omitted, particularly if handover can be effected seamlessly by the terminal.

Where there are two or more similar programs, a user may be required to select one of them prior to the step of receiving it from the second network area transmitter.

The data relating to available programs in a preferred embodiment further includes an identifier for each program. This can allow for a relatively straightforward determination of what programs are. Otherwise, the terminal may be required to perform some significant processing of data before it can make a determination of whether or not two programs in separate network areas are the same.

The data relating to available programs preferably has a hierarchical classification structure. This will tend to be the case in Internet Protocol datacasting networks, particularly those in which the programs are broadcast using time-slicing. In any case, the feature is particularly advantageous since it can allow relatively easy determination of whether or not programs are similar.

In a preferred embodiment of the invention the step of determining similar programs comprises determining which programs have an identifier in common with the first program. The identifier can be any one or more of a program identifier, a service identifier, a channel identifier, a category identifier and a genre identifier, for example.

The data relating to available programs can include data relating to transmission schedules of the programs.

According to a second aspect of the invention, there is provided a mobile terminal, comprising: a receiver arranged to receive data relating to available broadcast programs in first and second network areas; a memory arranged to store said program data; a handover handler operable whilst the terminal is receiving a first program from a transmitter in the first network area for detecting a need for handover to a second network area; a program data processor arranged to use the data relating to available broadcast programs in the first and second network areas to determine if the same program is available in the second network area, and otherwise to determine one or more programs which are similar to the first program; and a controller arranged to control the mobile terminal to receive from the second network area transmitter the first program or one of the similar programs as appropriate.

The invention might be summarised as being usable in situations in which a user is provided with the same or similar content when moving from one cell, service area or network area to another. These areas can be anything from small network cells to service areas in different countries etc. When a currently used service is not available nor it can be moved to a new cell that the terminal is entering, the closest alternative or several of the closest alternatives are provided. When different coverage areas have different services and programs, assisted handover can be very beneficial.

To facilitate the effectiveness of the invention, different network operators may agree on using the same structure, at least partly, in their ESGs in order to assist roaming.

The embodiments relate particularly to digital broadcasting networks, of which DVB-T (Digital Video Broadcasting-Terrestrial), ATSC (Advanced Television Systems Committee) and ISDB (Integrated Services Digital Broadcasting) are examples, in which the programs are broadcast using Internet Protocol datacasting with time-slicing, although the invention has broader application than this.

BRIEF DESCRIPTION OF THE DRAWINGS

Embodiments of the invention will now be described, by way of example only, with reference to the accompanying drawings, of which:

FIG. 2 illustrates an example of how service components are transmitted on a channel using time-slicing in the system in which the invention is employed;

FIG. 3A shows schematically one example of the hierarchy under which service components can be found;

FIG. 3B shows an example of a partial content of one service;

FIG. 7 illustrates certain branches of first and second hierarchical ESGs, relating to adjacent but different network areas, which is used to illustrate one embodiment of the invention.

DETAILED DESCRIPTION OF THE EMBODIMENTS

A multicast service system, in which a mobile terminal according to the invention, can operate bundles certain services together into a service set. Each service set is associated with identifying data including an identifier unique to the service set. The identifying data also includes a number of different type metadata items both for the service set and for the services included in the service set. The identifier and the metadata are preferably transmitted in a table format in the transport stream. The table can be similar to the tables used in DVB-T, such as for example the bouquet association table (BAT) of the standard ETSI EN 300 468 (the '468 standard). The identifier and metadata items are preferably presented as descriptors like those defined in the '468 standard.

One multicast service system may bundle services from one or more service operators into one or more service sets. These services may comprise live content and/or stored content. The multicast service system may forward the bundled service set to one or more multicast operators, which can then transmit the forwarded service sets as multicasts to receivers in IP (Internet Protocol) datacasting bursts. This is illustrated in FIG. 1.

Figure 1:
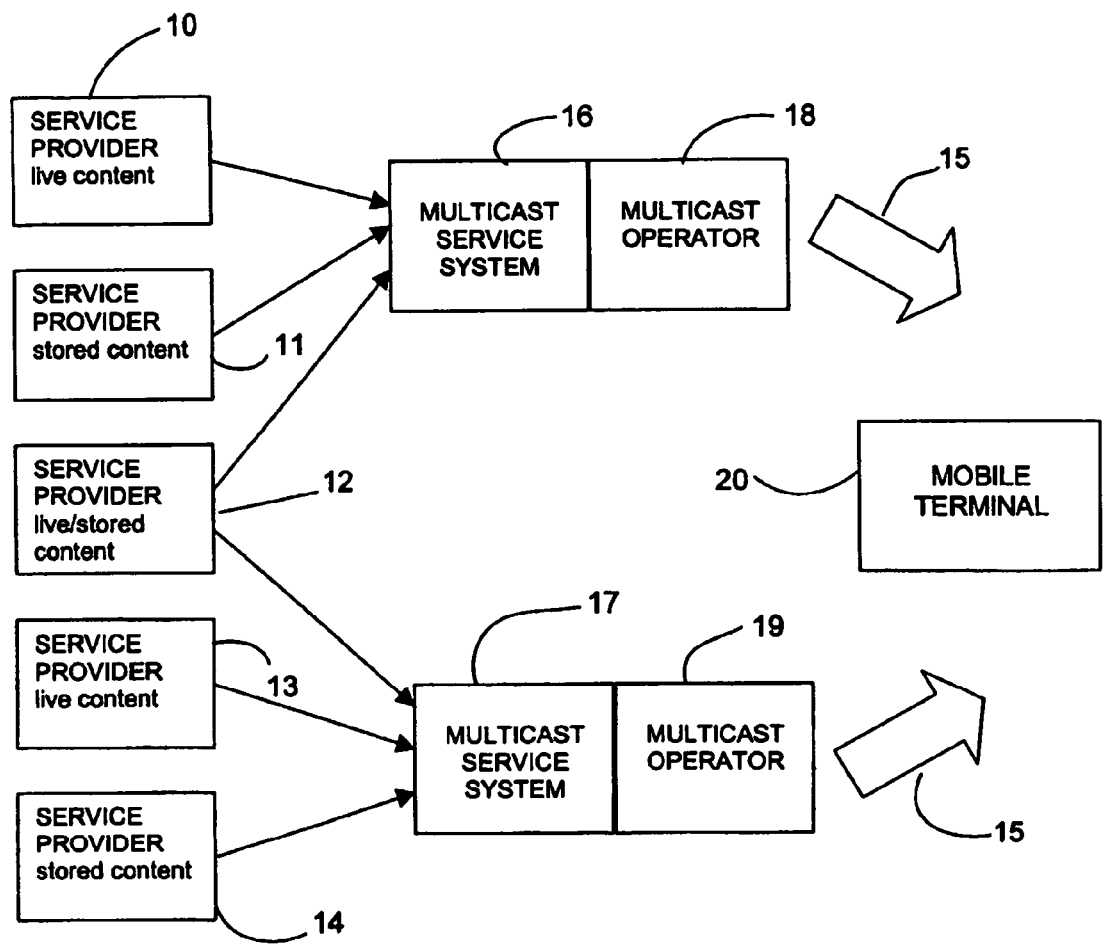
FIG. 1 illustrates an example of authoring of multicast service sets, and the provision of services to a mobile terminal, in a system in which the invention is employed.

Referring to FIG. 1, first to fifth service providers 10-14 are shown, each of which is a provider of live content, of stored content or of mixed content. The first to third service providers 10-12 provide services to a first multicast service system 16. The third to fifth service providers 12-14 provide services to a second multicast service system 17. Each of the multicast service systems 16, 17 forwards service sets formed by bundling received services to a respective multicast operator 18, 19. The service sets are then multicast in IP datacasting bursts 15, and can be received by a mobile terminal 20.

Each service provider may provide one or more services. Each service comprises one or more service components. Each of the service components may have a different media format. A service typically may comprise one or more of the following: an audio or video stream, teletext carousel, a set of web links, downloadable files of different content. etc. Normally, only one service is consumed by a user at a time. One service can comprise of one or more consecutive programs, similarly to conventional television and radio programs.

The terminal receives Service Information (SI) comprising time slicing related information such as e.g. burst sizes, maximum burst duration, which IP streams are included in particular time slice channels, etc. Also the terminal receives in SI information from where IP based service can be found from network such as e.g. carrier frequencies, used Packet IDentifiers (PID), transport_stream identifiers, etc. Real-time parameters relating to time slicing are carried in section headers of the sections within the bursts. These real-time parameters include delta-T parameter, i.e. time when next burst from current time slice channel can be assumed to be received after current section, end of the burst marker, etc.

The data items associated with and describing the service set, the services and the service components when combined with the service set schedule comprise Electronic Service Guide (ESG) data. ESG data is used to provide a user of a terminal with the ability to select the channels, services and items he/she is interested in, and to find items stored on the terminal. The ESG data is useable to provide an ESG, which contains information about the services available. An ESG can also be known as a Channel Guide, an Electronic Program Guide or a Channel selector. An ESG presents the service portfolio in a usable way, normally through a service hierarchy.

The service components (S11, ..., S1$m$; S21, ..., S2$n$) relating to a particular service may be transmitted in a burst over a DVB-T network. This is illustrated in FIG. 2. First and second bursts 30, 31 have a duration ('duration 1', 'duration 2'), defined by start and end times ('start time 1', 'start time 2'; 'end time 1, 'end time 2'). The bursts 30, 31 are transmitted with an interval ('interval 1') between the end of the first burst and the start of the second burst.

The content of consecutive bursts 30, 31 may be the same, or they may be at least partly different. Instead of a burst containing all service components for a set and containing service components relating only to that set, one burst may comprise any number of the service components of a service, or it may contain service components from one or more services or service sets. The order in which the service components are in the burst is determined by the multicast service system or by the multicast operator.

The service set schedule may be part of the ESG data, or it may be transmitted separately.

The ESG data or parts thereof may also be transmitted through a separate, second network. This second network would normally be a mobile phone network, such as GSM, GPRS, 3G or UMTS, but might be a WLAN or any other communications network. This second network preferably is wireless, but might instead be wired. The ESG data transmitted via the second network may be used by a terminal receiving the ESG data.

If transmitted over DVB-T, the ESG data may be transmitted on an IP Control Channel (IP-CC). The ESG data includes metadata about the services, such as what types of services are available, how the service content can be received and how it an be consumed. This metadata is sent as a set of announcement files using IP-based protocols. In one embodiment, the ESG data sent on the IP-CC is transmitted repeatedly, carousel-style.

In the FIG. 1 system, the available services are in one embodiment of the invention arranged hierarchically as illustrated in FIGS. 3A and 3B. FIG. 3A shows one example of the hierarchical structure of the services and FIG. 3B shows an example of a partial content of one service. At the highest level, the hierarchical structure contains categories. Services are classified with categories. There can be many levels of categories. The categories classify the service sets. Categories can include channels, for example from a certain topic or content type. A channel might be one set of services that the user can identify with one name or brand, for example CNN (RTM) or BBC (RTM). Below a category in the hierarchy there can be subcategories or service sets. Service sets combine the same kind of services together, although they can instead relate to an identifiable entity, for example CNN (RTM), or BBC(RTM). A service set is owned by a Service Provider (SP) or a Content Provider (CP). One CP or SP can have many service sets. Service sets may combine the same kind of services of one CP or SP together. One service can belong to many different service sets but all the services of one service set are preferably owned by the same SP or CP. A bundle is a sellable entity, i.e. a group of services that are sold together by an SP. A service always belongs to at least one bundle. Services are the lowest level of the hierarchy in this example. The hierarchy of the available services is quite static. Services and service sets can change, but changes are infrequent and no end time for the service is usually announced to the user. The ESG data contains metadata describing the level in question (i.e. whether it is a category, service set or service) and links to more detailed information. A service set can have a default service, i.e. a service which is opened as the service set is entered, identified by the metadata. A service set may also be associated in the user interface with a button or menu behind which there is a list of included services.

Each entity has an identifier. This identifier always is unique in the scope of the identifiers (of those entities) of the datacast operator. For example, a service identifier is unique in the scope of the service identifiers of the datacast operator, and a category identifier is unique among the datacast operator's category Ids etc.

The more dynamic part of ESG information is the program part. The program part includes service sessions, which are instances of services and which have a start time and a stop time. Service sessions comprise service items or service components. Service items are "pieces" of content that can be individually consumed. All the service items of the service session are transmitted using same kind of transmission parameters. As with service sessions, service items can have their own start time and stop time inside the service session. It depends on the multicast operator 18, 19 whether the schedules of the service items made are to be shown to the users. After transmission of the service session, the information related to sessions and 10 items is no longer of interest, so is not broadcast anymore.

This hierarchical structure makes it possible to present a service portfolio in a logical and associative format and allows for easy ESG presentation and retrieval. This makes it easier for the user of the terminal 20 to find the services that they are interested in, and also makes it easier for the operator 18, 19 to schedule the sessions so that the service sessions that are deemed to be likely to interest the same people overlap as little as possible. The ESG may be thought of comprising two parts, the first part, relating to categories, mainly being managed by the datacast/multicast operator, and the second part, relating to all hierarchy levels below categories, being managed by service providers.

An example is illustrated in FIG. 3A. Here, a service category could be "News" with a service set "CNN News Watch" and under that a service "Live Update" (FIG. 1a). The service News.CNNNewsWatch.LiveUpdate contains service sessions, for example a program about the latest business news as shown in FIG. 3B. The service sessions include items, which can be for instance news related to different parts of the world. If the items also are scheduled and the schedules are shown to the user, the user can watch the news only when a part or parts of interest is being transmitted.

Two kinds of announcements related to ESG information that are transmitted are hierarchy announcements and service session announcements. The division is based on the described ESG parts. The transmission of the announcement files can be done as continuous or carousel-type transmission, i.e., as soon as all the files of the announcements have been sent, they are sent again. There may be a pause between two consecutive transmissions. The terminal can start listening to the announcements when it needs the ESG information. The two kinds of announcements may be combined on a single carousel, or sent separately, using two carousels. In addition to these carousels, there may be a carousel for main pages, a carousel for Security Association (SA) files, and an alert carousel. Thus, there may be five carousels, namely hierarchy, session, main page, SA files and alert carousels.

Item announcements may be retrieved through an interaction channel such as a mobile phone communication network, i.e. they are not broadcast as are the other announcements.

Security association describes the security parameters used for protection. An SA file contains the information that is needed to be able to remove the protection. Service is the lowest level in the hierarchy of categories, service sets and services. A service always belongs to one CP/SP. Services have service sessions, which mean the scheduled transmission of content related to the service. A service session can contain one or more IP sessions.

As mentioned above, the hierarchy contains categories, service sets and services. The hierarchy is described in one file, typically expressed using XML. Thus, if only one language is supported, the carousel transmits the same hierarchy file over and over again. If multiple languages are supported, one file for every language is transmitted. Transmission of the hierarchy file or files constitutes hierarchy announcement.

The information included in the hierarchy files includes information relating to purchase channels, bundles, categories, service sets, services, and also other information, as follows. In addition to the hierarchical categorisation, the services may be associated with other classification and/or identification data such as the genre of the service Purchase channels describe the channel through which the bundles can be bought. The attributes describing a channel include: a unique identifier for the channel, an identification of the bearer through which the purchase request is sent, a purchasing address, a description of the purchase request, an identification of the bearer through which the purchase response is sent, a description of the response format, and a unique identifier for the e-commerce operator.

Services can be bought in bundles. Thus, bundles are the sellable items. These bundles are associated with one or more of the following data items: an identifier to unique to the bundle, a name describing the bundle, price information for the bundle such as e.g. a price for the whole subscription period, a price for the remaining time of the subscription period, subscription period start time, subscription period end time, currency, a purchase code, a descriptive label, and an identifier for each purchase channel through which the bundle can be bought. The descriptive label can be shown to the user to explain the use of the purchase item, and may take the form "3 months purchase", "purchase to the end of the current month", etc. A purchase code is used in an e-commerce system to identify the purchased bundle. In one embodiment of the invention for every bundle and period combination which can be purchased, there is a purchase code. In an alternative embodiment, there is a code for each bundle and a code for each period, allowing each bundle/period combination to be identified by a purchase code comprising a combination of the two codes. A bundle may be purchasable through one purchase channel, or it may be available through two or more purchase channels.

In an alternative embodiment, programs, channels and sessions can be purchased individually in addition to bundles. In this case, a code needs to be provided for each of the items which is individually sellable. In this case, there does not necessarily need to be an end time or duration, since the items tend to have a natural end time, so the purchase codes can be simpler.

To form the category information, one or more of (preferably all or most of) the following data items is given: a name for the category, a unique numeric identifier for the category. a short description for the category, an display order in which the network operator requires the alternatives of the category level to be shown, an indication of a parental rating, and a parent category identifier.

For the service set information, one or more of (preferably all or most of) the following data is given: a name for the service set, a unique numeric identifier for the service set, a short description for the service set, an display order in which the operator requires the service sets of the category to be shown, an indication of a parental rating, a reference to main pages of the service sets, information about the services of the service set, identification data for the services that belong to the service set, a display order of the service in a service set (in which order the services are shown to the user), a default service identification, and other operator specific attributes such as e.g. author, creation date. The value of the attributes can be a string, an integer, a date, a URL or any combination of all or some of these, for example the combination of an integer and a string value. The attributes may comprise one or more of a name, a description and a unique identifier for the attribute. The service set information may also include an identifier for each bundle that the service belongs to.

For each of the services one or more of (preferably all or most of) the following data is given: a name of the service, a unique identifier for the service, an indication of the genre of the service, a short description for the service, a URL where a detailed description can be found, a list of the identifiers of the bundles that the service belongs to, an indication of a parental rating of the service, a URL for a rating of the service, an indication of the type of the service, and other operator specific attributes such as for example the author and/or the creation date. The value of the attributes can be a string, an integer, a date, a URL or any combination of some or all of these. The attributes may comprise one or more of the following: a name, a description and a unique identifier for the attribute. The genre of the service may be indicated by using the same or similar alternatives as in the '468 standard v 1.4.1. The indication of the type of the service allows the terminal to differentiate between different services, for example DVB multicast services, online services and 3G multicast services.

The data related to a session item comprises a session starting time, an end time or alternatively a duration of the session.

The ESG data may additionally comprise carousel information, such as the type of the carousel, the IP addresses and ports of the other carousels, the expiry times and update intervals of the carousel information, a modification time of the hierarchy data, and references to the operator main page. The modification time is the time when the hierarchy was last modified. The operator main page is the page that the user can see first when opening the ESG. The operator main page may include the 10 most popular IPDC services, a list of the newest services, a list of recommendations etc. The main page may be available for display to the user very quickly after opening the ESG. The main page is sent in a main page carousel. The ESG data may also include a unique identifier for the ESG, and information concerning the languages of the ESG. Each supported language has a separate ESG data file.

Also announced is expiry time information, which indicates a time before which the announced information will not normally change. The expiry time is announced for hierarchy, session and main page carousels. For session and main page carousels, the update interval (in seconds) may be given, allowing the times for the next updates to be calculated without checking the hierarchy file.

Figure 4:
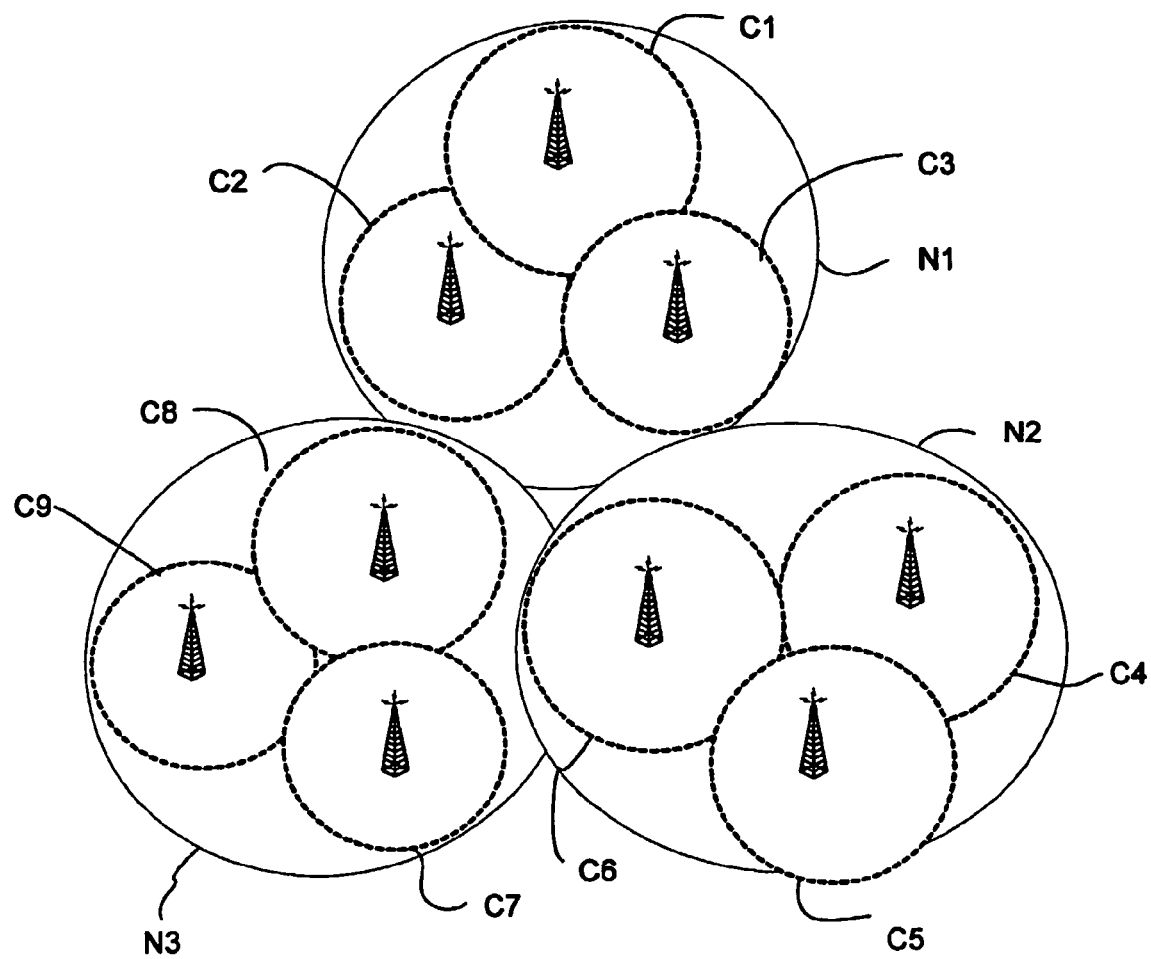
FIG. 4 shows a schematic example of how cells supported by different network operators together form a network.

An example of a network topology is illustrated schematically in FIG. 4. The network here is an IP datacast network using DVB-T, but this is not essential. The illustrated network consists of cells C1-C9, which are the smallest unit to which content can be sent. In a DVB-T network, a cell may be the transmission area of one IP encapsulator. In another embodiment of the invention one IP encapsulator can transmit to several cells. In that case the transmitted contents in those cells are same but they may use different frequencies. Still in another embodiment of the invention the content of one cell can be combined from contents of several IP encapsulators. The cells that transmit the same content together form a network area. Network areas are not fixed, and can be changed dynamically. The carousels used are local to the network areas. Thus, the information is specific for the network area. In this example, cells C1-C3 form a first network area N1, cells C4-C6 form a second network area N2, and cells C7-C9 form a third network area N3. For example, the second network area N2 may have its own hierarchy, main page, session, security association and alert carousels (not shown). Therefore the hierarchy announcements are made on a different IP address to the other network areas. The network areas that transmit the same service together comprise the service area of the service. All the service sessions of a service are the same throughout the whole service area. Thus, if the operator wants to transmit local news that is different from area to area, the service must also be different in the different areas. To be identified different, services must have at least different service identifiers. In the FIG. 4 the first and second network areas N1 and N2 together may form the service area of service X if service X is active only in those network areas. The third Network area N3 may form a different service area if it has at least different service identifiers but possibly also different services.

Figure 5:
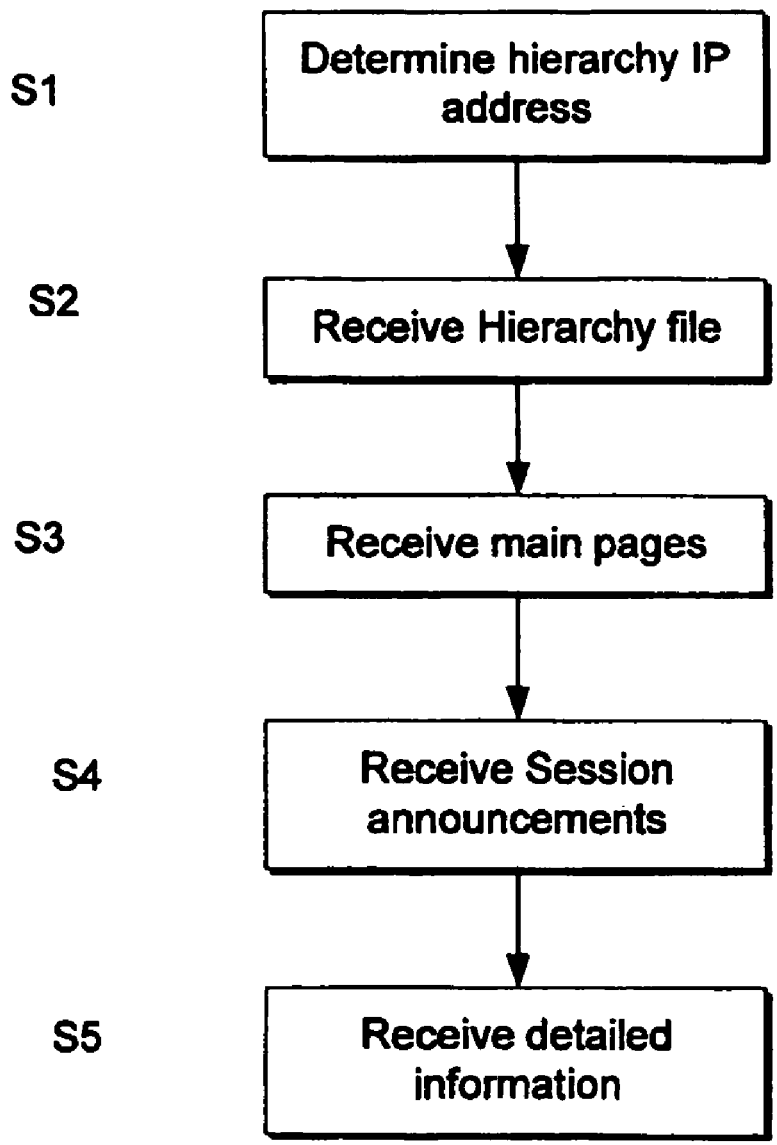
FIG. 5 is a flow diagram showing how a mobile terminal according to one embodiment of the invention can perform ESG discovery.

When the terminal 20 is turned on for the first time, the terminal does not have any ESG information. To be able to show the ESG information to the user, the terminal 20 must perform ESG discovery to receive the ESG data, for example via the IP-CC. The information reception can be divided into five phases which are, in summary: getting the IP address for the hierarchy file, receiving the hierarchy file, receiving the main pages, receiving the service session descriptions, and lastly retrieving the detailed information. This is illustrated schematically in FIG. 5.

At step S1, the terminal must first find out what is the IP address for the hierarchy information. There are a number of addresses that are reserved just for the ESG information, one address for each network area. The identity of the IP address for the hierarchy information file of the current cell may be obtained from the network. The mechanism for this depends on the network.

In a DVB-T network, the correct IP address for the hierarchy information file is in one embodiment of the invention received through the following information flow. Firstly, the receiver included in the terminal 20 scans through the available frequencies until the desired DVB-T network is found. The desired network can be the first network found, a user defined network, a network configured to the terminal etc. Next, the receiver receives the Network Information Table (NIT). In this context, the receiver also locates the IP/MAC Notification Table (INT). This is done by interpreting all linkage descriptors of type 0x0B in the NIT table. One DVB-T link may carry several IP platforms, which can be thought of as channels. The terminal 20 enquires of the receiver which IP platforms are available, and the receiver sends the information parsed from the NIT table to the terminal. Next, the terminal selects an IP platform and identifies the selected IP platform to the to receiver. The receiver then receives the INT table and parses it. To get the IP address for the hierarchy file, the terminal enquires of the receiver if it has a mapping for an address belonging to the ESG IP address range. The receiver then returns the IP address. It will be appreciated by the skilled person how the IP address can be obtained for other network types.

When the terminal 20 has determined the correct IP address, it opens the address and starts to listen. At step S2, the terminal receives a file containing the hierarchy information and saves it to the database. The hierarchy file may be written in XML, for example. The terminal 20 may obtain from the hierarchy file among other things the IP addresses for the other carousels. This allows the terminal to move to listen to the IP address of the main pages and receive them, which it does at step S3. The main pages are saved to the terminal 20 such that they can be showed to the user when needed. The terminal may further listen to the IP address of the session announcements and receive them at step S4. The service session information is described using for example SDP (Session Description Protocol) and XML files forming part of the hierarchy information. The SDP files contain the information that the terminal needs to be able to receive and consume the sessions. The XML file is used for describing the content of sessions for the user. When the terminal 20 receives the session SDP files and the XML file at step S5, it parses them and saves the information to the database.

If after receiving the hierarchy and session announcements, the end-user still wants to get more information about the services, service sessions or items, more detailed information can be fetched for example via a web portal. The URLs identifying these web portals are given in the announcements.

Figure 6:
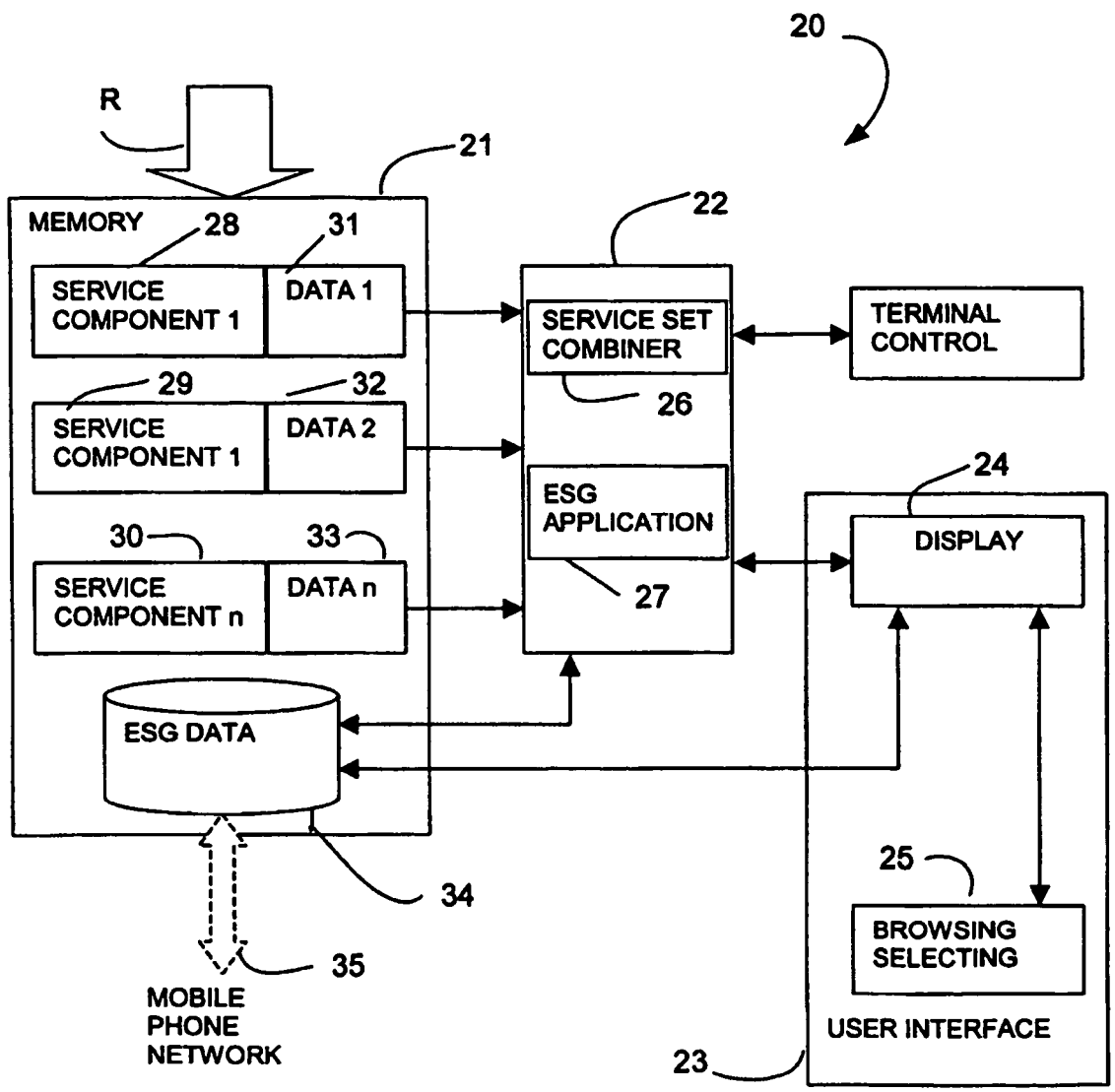
FIG. 6 shows schematically the arrangement of selected hardware and software components forming part of a mobile terminal according to and operating according to different aspects of the invention.

In one embodiment of the invention, shown in FIG. 6, the mobile terminal 20, only partly shown, is implemented as a DVB-T client having a DVB-T receiver. The receiver has an air interface with the DVB-T network. The terminal 20 gets the information R from the DVB-T network as IP datacasting bursts through the receiver. ESG data is stored in an ESG database 34.

In order to make sure that the user does not have outdated information, the information must be updated every now and then. The announcements may be sent continuously, thus the terminal 20 could be made to listen to the latest announcements all the time. However, because it can be important to save power, each announcement contains an expiry time, which is an absolute time indicating when the next version is due. The new version is not necessarily different from the old version, but it is guaranteed that there will not be any changes during the validity of one version. The update interval is different for the different parts of the ESG because the probability of a change is different. For example, the update interval of the hierarchy usually is much longer than the update interval for the sessions. The expiry time may be used for controlling the receiver to turn-on. In particular, the terminal need only receive announcements when the currently stored announcement is just about to or has just expired.

Therefore, after receiving ESG information for the first time, if the terminal 20 does not move from one network area to the area of another network, the terminal need only listen to the announcements when it is time for the update. In case of a hierarchy file update, the terminal 20 receives the hierarchy file, then determines if the modification time of the hierarchy is later than the modification time of the hierarchy in its ESG database 34. If the received hierarchy is newer, it is updated to the ESG database 34. Otherwise the terminal 20 just notes the next expiry time. When checking the hierarchy file, the terminal 20 also reads the expiry time for the session and main page carousels. However, because the update interval for these carousels can be shorter than the update interval for the hierarchy, the update interval may also be given for sessions and main pages such that the following expiry times can be calculated without checking the hierarchy file.

If unexpected updates occur during the update interval, the terminal can be informed through an alert service that the ESG information should be updated. This can occur in any suitable way, for example using a notifications carousel.

Operation of the mobile terminal 20 is now described in more detail with reference to FIG. 6. Referring to FIG. 4, the mobile terminal 20, only partly shown, to comprises generally a memory 21 which is connected to a service data handler 22 and to a user interface 23. The user interface 23 includes a display 24 and a browsing selector 25, for example a keypad or a touch-screen input device. The data handler 22 is formed from a service set combiner application 26, an ESG handling application 27 and a comparison application (not shown) for determining similarity of identifying data and other characteristic data items relating to one or more of at least the following: hierarchies, programs, services, channels, categories, genres. The memory 21 is arranged to store up to N service components, three of which are illustrated at 28-30, along with the service identification data 31-33 corresponding thereto. The memory 21 also stores ESG data in an ESG data storage area 34.

The mobile terminal 20 receives and stores the IP datacasting burst comprising ESG data and the service components and the associated data in a memory. The received data might be buffered prior to storing it. On the basis of the ESG data and the associated data items, the terminal 20 is able to associate the service components with the appropriate service sets. The user of the terminal 20 may browse and select the received content for viewing or rendering. The data items describing the various service components can be used for setting up a hierarchy for categorising the received content items. Further the data in the service set schedule may be used for arranging the services in order according to their timing (now, next, today, next week, etc.).

The mobile terminal 20 can extract from the received ESG data, the received service set schedule information and from the received Service Information (SI) and Program Specific information (PSI) tables information concerning the timing of the transmissions and concerning the carrier transmission frequency or frequencies of the service sets or service components. Following selection of a service set or service component, the terminal 20 is therefore able to tune to the correct frequency at the appropriate time when the desired or selected service set or service component is being transmitted. The terminal can remain turned off at other times in order to save power.

As described below, the different service sets are shown displayed in the user interface of the terminal. The user interface also comprises browsing and selecting means.

The terminal 20 operates to store received service components and the corresponding service identification data, as well as the received ESG data, in the appropriate parts of the memory 21. The ESG data may be received over the DVB-T network, or through a mobile telephone network, illustrated at 35. The service set combiner application 26 uses the data to form service sets including only the services which are intended to form part of the respective service sets. The hierarchy data is used to categorise different content types. Service components can be included in more than one service set. Next, the data is sorted in an appropriate manner.

Service selection is enabled by the user interface 23, which can take any suitable form. Following service selection, the service is consumed.

A received ESG may be valid only for the location of the terminal, or it may be valid for the present cell and for some neighbouring cells, or it may be valid for multiple network areas. A terminal may receive only part of an ESG or schedules for an ESG, or it may receive the entire ESG, describing all the available services and their schedules.

An example operation of the terminal will now be described with reference to FIG. 4. A terminal originally within the scope of the first network area N1 has received and stored a first electronic service guide ESG1, relating to that network area. The terminal then moves to a location where it may also receive services provided for the second network area N2. The services in N2 may be partly or completely different from the services in N1. When the terminal subsequently moves further in the same direction, it may then receive services only in respect of the second network area N2, i.e. it can no longer receive services in respect of the first network area N1. Before this occurs, the terminal can detect the need for handover, using field strength or Bit Error Rate (BER) for example, or alternatively a user can decide that handover is desired.

Before it can access the services provided in a new network area, the terminal needs the ESG (in whole or in part) for this network area. The relevant ESG may be received as a result of an ESG discovery process, as described above. Alternatively, the terminal may have received in advance the ESG of the new service area or a schedule for the ESG in the new service area as a result of a request. The request for data relating to the ESG and the response comprising the schedule or the ESG or parts thereof may be communicated using another network, for example the mobile phone network 23.

When the user is receiving a service using a terminal which moving from one geographical location to another and it is detected that the quality of signal reception is no longer satisfactory, the terminal starts searching for alternative ways of continuing the reception of the service, by starting a service discovery process. As a result the terminal may find a network address for an ESG which is valid for the location of the user terminal. Also in this case SI and/or PSI information might be needed.

In some embodiments of the invention the same ESG may be used for more than one network area even though the services provided within the different network areas are different. In such a case the terminal needs to receive also SI and PSI information relating to the new network area so that it can access the available services. SI and particularly INT table therein are then used to find out if same service that is consumed in current cell is available also in the new cell. Typically, the INT table in one cell contains information from current and neighbouring cells. Accordingly, the receiver can know if the same service is available in new cell even before handover. As one service may comprise one or more IP streams, the INT table can be used to tell receiver how and where to find the IP streams from the current network. The INT table may also be divided between more than one service providers. So, if no same streams are found from the current service operator's INT table, the receiver can try to find the same IP streams from the INT tables of one or more different service operators.

When the terminal has received at least one new ESG which is valid for the location of the terminal, the terminal compares the data in the received ESG to the stored ESG data in order to find the same services or similar services. If the new ESG originates from the same network operator as the previous ESG, the ESGs will tend to be at least partly similar.

If the terminal determines that the same service is available from the new cell and the terminal 20 has access to that service, the service is consumed from the new cell. Handover should be smooth if possible If the same service is not available in the new cell for any reason, the terminal 20 determines if the service is available from any other cells that the terminal is able to receive, and consumes the service from any of those new cells if possible. If the service is not available in any new cell, the terminal 20 determines a similar service, and through the user interface 23 offers this service to the user. If the user indicates that he or she requires the similar service, then this service is consumed. Examples of services to which this might be particularly desirable are weather reports, traffic information services and sports events. The selection of the similar service by the terminal 20 is based on certain criteria, for example matching channels, channel categories, subcategories, genres or program types etc. Similar service selection can be implemented in any convenient manner in the terminal 20. Similar service selection could be automatic, i.e. the similar service is consumed without requiring approval by the user. Alternatively, it could be manual. In this case, the terminal determines which of the services available in the new cell are similar to the service that was being consumed and presents these services on the user interface as the available options. Service selection then has to be made manually by the user, although the available options are those which the terminal deems to be similar. Similar service selection could instead take any form between those two extremes, for example requiring user approval of a single proposed similar service before consuming it. Alternatively, service selection may involve examining user preferences stored on the terminal 20 and using those preferences and a determination of what services are similar to prepare a list of similar services which may be of interest to the user. The user preferences and the determination of what services are similar may be used to prepare a single proposed similar service, if this is required by the user preferences, or if there is only one service which meets the user preference and the similar service requirements. The user preferences may require that only services which are free or to which the user is already subscribed are displayed on the similar services is list. If this is not set, then the selection of a similar service from the list may initiate a payment or subscription process, if this is appropriate to the service.

A example of this is now described with reference to FIG. 7. In the example, a user is on train in the United Kingdom from London to Manchester. Both Greater London and Greater Manchester have their own broadcasting service areas, and the channels are similar for those areas. Whilst in the coverage area of the Greater London cell, the user is watching a program called "Chelsea—Arsenal" from a service called PremierLeague that is one of three services of a LocalCorner channel, provided by a nationwide sports content provider. The watching of this program involves the consumption of streamed video data which is transmitted on the appropriate IP streams. The LocalCorner channel is found under the Football subcategory of the classification Sports. Sometime during the journey, the terminal moves from the coverage area of the cell or cells forming the Greater London service area. At that point, the terminal starts receiving from a cell forming part of the Greater Manchester service area. The terminal 20 performs ESG discovery for the new cell. From the ESG data, the terminal 20 discovers that the program previously being watched is not available in the new cell. The terminal 20 then compares the programming information and ESG data from the new network area with the content which is currently being consumed. The terminal 20 determines that the same channel, LocalCorner, exists, but that this channel has only one service, in this case its default service, named ManFootball. The current program on the ManFootball service is Football Association (FA) cup previews. The terminal thus determines this program to be the most similar service, and proposes it. Proposal typically involves displaying text indicating that the currently viewed program will no longer be available, and indicate the proposed programs (in this case, there is only one) with an accept option and a decline all proposals option. Each proposed program preferably is displayed along with data indicating whether the program is free to view, whether the user already has a valid subscription covering then program or whether an additional subscription is needed. In this example, the only proposed program is included in the user's basic subscription package from the national mobile broadcasting operator, so no subscription or payment is needed. The user can commence consuming the proposed program by is selecting it using the user interface 23 of the terminal 20. If the user declines the proposed program, the terminal 20 may display the ESG for the Greater Manchester service area. The ESG may initially be shown at the top, i.e. service category, level, or it may be at the lowest level which is common to both of the service areas, in this case LocalCorner.

Another, in some ways more detailed, example will now be described with reference to FIG. 8. In the following, the ESG relating to the cell that is being exited is referred to as the old ESG, and the ESG relating to the cell being entered is referred to as the new ESG.

When the new ESG has been received, the terminal may find the necessary data for connecting to the service based on the stored data. This example utilises the fact that, if the new network area is served by the same datacast operator as the existing network area, the structure of the ESG is likely to be substantially similar, particularly at regards categories and subcategories. Also, services that are transmitted in both network areas are likely to have the same session_id in those network areas. In this case, the terminal 20 can find the same service, if there is one, by searching for the session_id in the received new ESG. This is shown at step S1.

The same service (identified by the session_id) may be found on other channels (identified by the service_set_id) of the same operator. Thus, the same service may be found in the new ESG as part of a different channel, or even a different category or subcategory. When the same service is found in the new ESG, progression is made to step S2, and otherwise the operation proceeds to step S3

To facilitate searching, certain data from the ESG for the cell or service area that the terminal is leaving is stored on the terminal. For the search of step S1, at least the session_id is stored temporarily and in its entirety. The other descriptive, classifying and/or identifying data relating to the service, such as category_id, service_set_id and service_id, which are identifiers of the category, the service set and the service respectively, may also be stored in whole or in part at least temporarily. This information is also used for the steps S3, S11, S15 and S19, described below. It is also used to determine the similarities between the existing and the new ESGs. This typically involves comparing also other identifiers relating to the searched session_id and may thus draw conclusions on the similarity between the old ESG and the new ESG. The terminal can store data concerning the similarities of these ESGs for use when searching for services. The determination as to the degree of similarity can be carried out during or after the search of step S1. The conclusions are used for the steps of S2, S8 and S16, described below.

At step S2, it is determined whether the hierarchy under which the service is found is the same in the old and the new ESGs. If the service is found under two or more hierarchies in either or both ESGs, a positive determination is made if there is any match. A positive determination results in progression to step S4.

The terminal checks at step S4 if the protection_id for the service is the same in both ESGs, since this is not necessarily the case. If the protection_id is the same or if one is not provided, the handover can be made smoothly without interruption in the service at step S5. If it is not the same, this is notified to the user at step S6. Here, the user may also be given information concerning the possibilities of purchasing the service, or bundles including the service. The pricing of the service in the new area may be different for users having subscribed or purchased the service in other areas. Subscription or purchase data may be communicated to the operator or service provider as appropriate, for pricing purposes.

Otherwise, at step S5 it is assumed that the new ESG relates to the same operator and the program is provided in a different channel, or alternatively the new ESG related to a different operator but the operators have agreed on common program identifiers. The program is consumed at step S7.

If the same session_id is not found at step S1, it is determined at step S3 whether the same service (identified by the service_id) is found in the new ESG. The service could be present in the new ESG at any point, not necessarily in the same category. If the same service is found, the terminal determines at step S8 whether the new and old ESGs have the same hierarchy down to the level of services. The user is notified of a positive result, and the current program then is shown to the user at step S9 either immediately or after the user has accepted to receive the current program. If the received service was a file download from a file download carousel, step S9 involves searching the carousel for the same session_id. In this case, the user is notified of the possible interruption in the file download process. Depending on the terminal and service capabilities, the download either is interrupted and discarded or is resumed from the new download carousel. Otherwise, step S9 involves the terminal offering the user, through the user interface 23, one or more of the current programs in the service set having the same category and/or subcategory. Their titles or other describing data might be displayed as part of the offering. The user may then select/ accept one of the shown programs for viewing or receiving. If step S8 returns a negative result, the terminal at step S10 offers the user, through the user interface 23, the current program or programs in the service set.

If at step S3 the same service_id is not found, it is determined at step SI I whether the same service_set_id (i.e. the same channel) is found. If it is the terminal checks at step S12 if a default service is defined for this channel. If a default service is defined, the terminal at step S13 notifies the user of this and begins to show the default service (program) to the user. Alternatively, the terminal could require acceptance of the default service by the user before showing it. If step S12 reveals that there is no defined default service, at step S14 the user is presented with the option of selecting for consumption one or more of the services (programs) available in this channel, the services being selected according to any suitable criteria. The user may then select one of the presented programs (or the program if only one is displayed) for viewing, or alternatively take the user to an appropriate part of the ESG.

If the same channel is not found at step S11, the terminal determines at step S15 if the same category, identified through the category_id) if found. If it is, step S16 determines if there is a similarity in the category hierarchy (i.e. more than one similar category can be found). On a positive result, the terminal shows to the user at step S17 a list of one or more of the channels (one or more service_set_id). On a negative result, it is assumed that there is no similarity in the categories/subcategories, and the user is taken at step S18 to a suitable part of the ESG, for example the ESG root or a starting page or similar associated with the network operator If there is no category match found at step S15, the user may be taken to a suitable part of the ESG, for example the ESG root or a starting page or similar associated with the network operator. Alternatively, the terminal may also use the genre of the service for determining whether a service is similar. This is illustrated at step S19. This may depend on a user preference setting, provided previously using the user interface 23. At step S19, it is determined whether any services forming part of the ESG have the same genre as the old service. If there are any such services, these are presented for selection at step S20.

Figure 8:
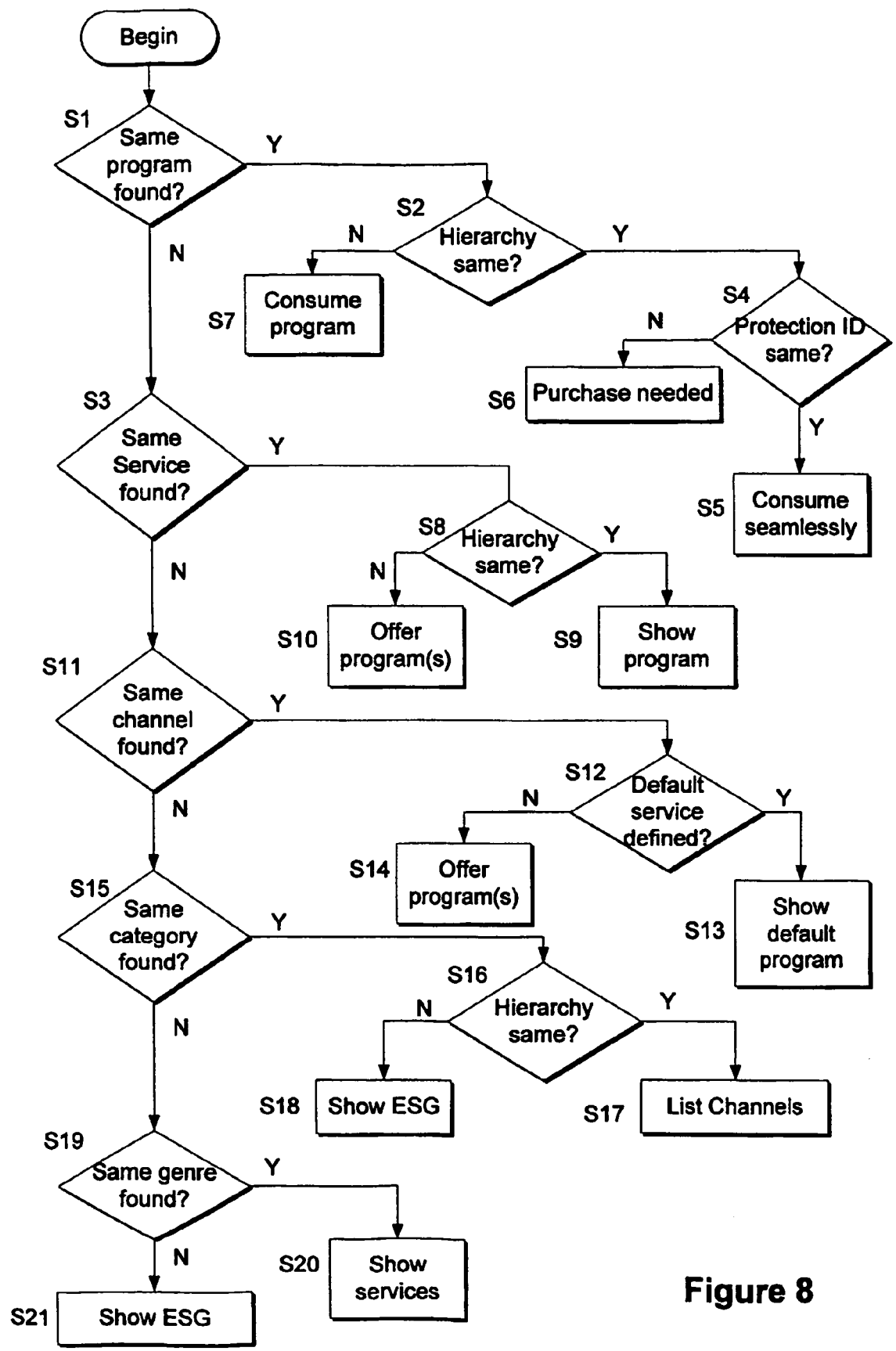
FIG. 8 is a flow diagram which is used to illustrate one embodied operation of the FIG. 6 mobile terminal according to the invention.

The genre determining step S19 can instead be performed at any other stage of the FIG. 8 similar service determining process. For example, step S19 can follow immediately from a negative determination at any of steps S1, S3 and S11.

The invention claimed is:

1. A method comprising:
receiving data relating to available broadcast programs in a first network area, the data including at least one identifier for each available broadcast program, and storing said data in a mobile terminal;
while receiving a first program from a transmitter in the first network area, the mobile terminal detecting a need for handover to a second network area;
the mobile terminal using data relating to available broadcast programs in the second network area, the data including at least one identifier for each available broadcast program, to determine if the first program is available in the second network area, and
the mobile terminal receiving the first program from a transmitter in the second network area if it is available, and
if the first program is not available, the mobile terminal comparing the data relating to the first program to the data relating to available broadcast programs in the second network area to determine one or more programs which are available in the second network area and which have one or more identifiers in common with the first program, thereby identifying one or more other programs, and the mobile terminal subsequently receiving one of the one or more other programs from the second network area transmitter.

2. The method as claimed in claim 1, comprising presenting the first program or the one or more other programs using a user interface.

3. The method as claimed in claim 2, wherein the presenting step includes indicating, with the one or more other programs, one or more data elements which are common to the one or more other programs and to the first program.

4. The method as claimed in claim 1, comprising requiring user acknowledgement prior to the step of receiving one of the one or more other programs from the second network area transmitter.

5. The method as claimed in claim 1, comprising requiring a user to select one of at least two or more other programs prior to the step of receiving it from the second network area transmitter.

6. The method as claimed in claim 1, wherein the data relating to available programs includes an identifier for each program.

7. The method as claimed in claim 1, wherein the data relating to available programs has a hierarchical classification structure.

8. A memory embodying software executable by a processor to perform the method as claimed in claim 1.

9. The method as claimed in claim 8, in which the identifier is a program identifier.

10. The method as claimed in claim 8, in which the identifier is a service identifier.

11. The method as claimed in claim 8, in which the identifier is a channel identifier.

12. The method as claimed in claim 8, in which the identifier is a category identifier.

13. The method as claimed in claim 8, in which the identifier is a genre identifier.

14. The method as claimed in claim 1, wherein the data relating to available programs includes data relating to transmission schedules of the programs.

15. An apparatus, comprising:
a receiver configured to receive data relating to available broadcast programs in first and second network areas, the data including at least one identifier for each available broadcast program;
a memory configured to store said program data;
a handover handler configured, while the terminal is receiving a first program from a transmitter in the first network area, to detect a need for handover to a second network area;
a program data processor configured to use the data relating to available broadcast programs in the first and second network areas to determine if the same program is available in the second network area, and
a controller configured, if the same program is available in the second network area, to control the mobile terminal to receive from the second network area transmitter the first program,
the program data processor being configured, if the same program is not available in the second network area, to compare the data relating to the first program to the data relating to available broadcast programs in the second network area to determine one or more programs which are available in the second network area and which have one or more identifiers in common with the first program, thereby identifying one or more other programs; and the controller configured, if the same program is not available in the second network area, to control the mobile terminal to receive from the second network area transmitter one of the one or more other programs, where the apparatus is embodied in a mobile terminal.

16. The apparatus as claimed in claim 15, comprising a user interface configured to present the received first program and the one or more other programs.

17. The apparatus as claimed in claim 16, wherein the user interface is configured to indicate with the one or more other programs one or more data elements which are common to the one or more other programs and to the first program.

18. The apparatus as claimed in claim 15, in which the controller is configured to require user acknowledgement through the user interface prior to receiving one of the one or more other programs from the second network area transmitter.

19. The apparatus as claimed in claim 15, in which the controller is configured to require a user to select one of two or more other programs through the user interface before receiving it from the second network area transmitter.

20. The apparatus as claimed in claim 15, wherein the data relating to available programs includes an identifier for each program.

21. The apparatus as claimed in claim 15, wherein the data relating to available programs has a hierarchical classification structure.

22. The apparatus as claimed in claim 15, wherein a program data processor is configured to use the data relating to available broadcast programs in the first and second network areas to determine which programs have one or more data elements in common with the first program.

23. The apparatus as claimed in claim 22, in which the identifier is at least one of: a program identifier, a service identifier, a channel identifier, a category identifier, and a genre identifier.

24. The apparatus as claimed in claim 15, wherein the data relating to available programs includes data relating to transmission schedules of the programs.

* * * * *